US010773248B2

(12) United States Patent
Ding et al.

(10) Patent No.: US 10,773,248 B2
(45) Date of Patent: Sep. 15, 2020

(54) ZEOLITES, THE PRODUCTION THEREOF, AND THEIR USES FOR UPGRADING HEAVY OILS

(71) Applicant: Saudi Arabian Oil Company, Dhahran (SA)

(72) Inventors: Lianhui Ding, Dhahran Camp (SA); Manal Al-Eid, Dhahran (SA); Essam Al-Sayed, Al-Khobar (SA); Kareemuddin Shaik, Dhahran (SA); Abdennour Bourane, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 325 days.

(21) Appl. No.: 15/790,361

(22) Filed: Oct. 23, 2017

(65) Prior Publication Data

US 2018/0333708 A1  Nov. 22, 2018

Related U.S. Application Data

(60) Provisional application No. 62/507,515, filed on May 17, 2017.

(51) Int. Cl.
| | |
|---|---|
| *C01B 39/48* | (2006.01) |
| *B01J 29/70* | (2006.01) |
| *C10G 11/05* | (2006.01) |
| *C10G 47/16* | (2006.01) |
| *C10G 47/00* | (2006.01) |
| *B01J 29/04* | (2006.01) |
| *B01J 35/02* | (2006.01) |
| *B01J 29/76* | (2006.01) |
| *B01J 35/00* | (2006.01) |
| *C10G 47/20* | (2006.01) |
| *C01B 39/02* | (2006.01) |
| *B01J 29/78* | (2006.01) |
| *B01J 35/10* | (2006.01) |

(52) U.S. Cl.
CPC ......... *B01J 29/044* (2013.01); *B01J 29/045* (2013.01); *B01J 29/7007* (2013.01); *B01J 29/7615* (2013.01); *B01J 29/7815* (2013.01); *B01J 35/0013* (2013.01); *B01J 35/023* (2013.01); *B01J 35/1057* (2013.01); *B01J 35/1061* (2013.01); *C01B 39/026* (2013.01); *C01B 39/48* (2013.01); *C10G 11/05* (2013.01); *C10G 47/20* (2013.01); *B01J 2229/14* (2013.01); *B01J 2229/186* (2013.01); *B01J 2229/22* (2013.01); *B01J 2229/34* (2013.01); *B01J 2229/38* (2013.01); *B01J 2229/42* (2013.01); *C10G 2300/202* (2013.01); *C10G 2300/205* (2013.01)

(58) Field of Classification Search
CPC ....... C01B 39/02; C01B 39/46; C01B 39/026; B01J 29/7007; B01J 29/041; B01J 29/044; B01J 29/045; B01J 29/7615; B01J 29/7815; C01P 2004/64; C01P 2006/16; C01P 2006/17; C01P 2006/12; C01P 2006/14; C10G 11/05; C10G 47/16; C10G 47/20

See application file for complete search history.

(56) References Cited

U.S. PATENT DOCUMENTS

2012/0258852 A1  10/2012  Martinez et al.

OTHER PUBLICATIONS

Da Silva et al, "Water-tolerant zeolite catalyst for the acetalisation of glycerol", Green Chemistry (2009) 11, pp. 38-41. (Year: 2008).*
Oers et al, "Fomration of a combined micro- and mesoporous material using zeolite Beta nanoparticles", Microporous and Mesoporous Matierials, 120 (2009) pp. 29-34 (Year: 2009).*
Wan et al, "Zwolite beta synthesized with acid-treated metakaolin and its application in diesel hydrodesulfurization", Catalysis Today, 149 (2010) pp. 69-75 (Year: 2010).*
Moller et al, "One-Step Synthesis of Hierarchical Zeolite Beta via Network Formation of Uniform Nanocrystals" J. Am. Chem. Soc, 2011, 133, 5284-5295 (Year: 2011).*
International Search Report and Written Opinion pertaining to International Application No. PCT/US2013/030430, 16 pages.
Li, Yingxia, et al., Transalkylation of Multi-secbutylbenzenes with Benzene over Beta Zeolite, Chinese Journal of Chemical Engineering, vol. 22, No. 8, Jun. 19, 2014, pp. 898-902.
Camblor et al., "Crystallization of zeolite beta: Effect of Na and K ions", Zeolites, vol. 11, pp. 202-210, Mar. 1991.
Camblor et al., "Synthesis of nanocrystalline zeolite Beta in the absence of alkali metal cations", Progres in Zeolite and Microporous Materials Studies in Surface Science and Catalysis, vol. 105, pp. 341-348, 1997.
Camblor et al., "Characterization of nanocrystalline zeolite Beta", Microporous and Mesoporous Materials, vol. 25, pp. 59-74, 1998.
Ding et al., "Effect of agitation on the synthesis of zeolite beta and its synthesis mechanism in absence of alkali cations", Microporous and Mesoporous Materials, vol. 94, pp. 1-8, 2006.

(Continued)

*Primary Examiner* — David M Brunsman
(74) *Attorney, Agent, or Firm* — Dinsmore and Shohl, LLP

(57) ABSTRACT

According to one or more embodiments, a nano-sized, mesoporous zeolite particle may include a microporous framework comprising a plurality of micropores having diameters of less than or equal to 2 nm and a BEA framework type. The nano-sized, mesoporous zeolite particle may also include a plurality of mesopores having diameters of greater than 2 nm and less than or equal to 50 nm. The zeolite particles may be integrated into hydrocracking catalysts and utilized for the cracking of heavy oils in a pretreatment process.

21 Claims, 2 Drawing Sheets

(56) References Cited

OTHER PUBLICATIONS

Kim et al., "Oligomerization and isomerization of dicyclopentadiene over mesoporous materials produced from zeolite beta", Catalysis Today, vol. 232, pp. 69-74, 2014.
Landau et al., "Collodial Nanocrystals of Zeolite β Stablized in Alumina Matrix", Chem. Mater., vol. 11, pp. 2030-2037, 1999.
Prokesova et al., "Preparation of nanosized micro/mesoporous composites via simultaneous synthesis of Beta/MCM-48 phases", Microporous and Mesoporous Materials, vol. 64, 165-174, 2003.
Garcia-Martinez et al., "A mesostructured Y zeolite as a superior FCC catalyst—from lab to refinery", The Royal Society of Chemistry, Chem. Commun, vol. 48, pp. 11841-11843, 2012.
GCC Examination Report dated Nov. 25, 2019 for application No. 2018/35309 filed May 16, 2018.

* cited by examiner

ZEOLITES, THE PRODUCTION THEREOF, AND THEIR USES FOR UPGRADING HEAVY OILS

CROSS REFERENCE TO RELATED APPLICATIONS

This application claims priority to U.S. Provisional Application No. 62/507,515, filed May 17, 2017, and entitled "ZEOLITE BETA CATALYSTS, THE PRODUCTION THEREOF, AND THEIR USES FOR UPGRADING HEAVY OILS," the entire contents of which are incorporated by reference.

BACKGROUND

Field

The present disclosure relates to zeolites and, more specifically, to zeolites that may be suitable for use in the treatment of heavy oils, including crude oils, using a catalytic pretreatment process.

Technical Background

Ethylene, propylene, butenes, butadiene, and aromatic compounds such as benzene, toluene, and xylene are basic intermediates for a large portion of the petrochemical industry. They are mainly obtained through the thermal cracking (sometimes referred to as "steam pyrolysis" or "steam cracking") of petroleum gases and distillates such as naphtha, kerosene, or even gas oil. These intermediate compounds may also be produced through refinery fluidized catalytic cracking (FCC) processes, where heavy feedstocks such as gas oils or residues are converted. For example, an important source for propylene production is refinery propylene from FCC units. However, the distillate feedstocks such as gas oils or residues are usually limited and result from several costly and energy intensive processing steps within a refinery.

However, as demands rise for these basic intermediate compounds, other production sources must be considered beyond traditional thermal cracking processes utilizing petroleum gases and distillates as feedstocks.

BRIEF SUMMARY

Accordingly, in view of the ever growing demand of these intermediary petrochemical products such as butene, there is a need for processes to produce these intermediate compounds from other types of feedstocks that are available in large quantities at relatively low cost. The present disclosure is related to zeolites that, in some embodiments, may be utilized in processes and systems for producing these intermediate compounds, sometimes referred to in this disclosure as "system products," by the direct conversion of heavy oil feedstocks oils such as crude oil. Conversion from a crude oil as a feedstock may be beneficial as compared with other feedstocks in producing these intermediate compounds because it may be generally less expensive, more widely available than other feedstock materials, or both.

According to one or more embodiments, heavy oils may be cracked to form system products such as light olefins, such as butene, by steam cracking. However, steam cracking of heavy oils can lead to increased coking, which may require the shutdown of a refining operation for coke removal. Additionally, the relatively high amount of aromatics in heavy oils may cause the steam cracking of heavy oils to form undesirable products and low light olefin content. In some cases, polyaromatics present in the heavy oil feedstock may be unconvertible by steam cracking. It has been found that pretreating the heavy oil feedstock to reduce or remove aromatics and other unwanted species, such as one or more of metals, sulfur, and nitrogen, may increase the production of light olefins and decrease coking. Such a pretreatment, according to one or more embodiments, may comprise one or more of hydrodemetalization, hydrodenitrogenation, hydrodesulfurization, and hydrocracking of aromatics.

Conventional hydrotreating catalysts, due at least in part to their relatively weak acidity, may not effectively convert polyaromatics and the saturated polycyclic species. Hydrocracking catalysts with zeolite as key cracking component, such as those used in steam cracking, may have much stronger acidity than conventional hydrotreating catalysts, and are able to greatly enhance the conversion of aromatics. However, the pore opening of the conventional zeolytic catalysts, such as zeolite Y and zeolite Beta, may be too small to allow the large molecules of a heavy oil feedstock to diffuse into the active sites located inside the zeolite. Additionally, relatively large particle sizes of these conventional zeolitic catalysts may limit access of the heavy oils to active catalytic sites on the catalyst.

It has been discovered that two ways to solve this problem (that is, the problem of increasing aromatics conversion for relatively large molecules present in a heavy oil stream) are to increase the zeolite pore size and to reduce the particle sizes of the zeolites. It has been found that nano-size zeolites can greatly increase the external surface area and shorten the diffusion path of the molecules, and the addition of mesopores in the zeolite may make additional active sites available for catalytic activity. As described herein, increased pore size can be achieved, in one or more embodiments, by the incorporation of mesopores in a zeolite. Particle size reduction may be achieved, according to one or more embodiments, by particular zeolite fabrication techniques described herein.

According to embodiments disclosed herein, zeolite Beta may be produced and utilized as a hydrocracking catalyst which has a relatively small particle size (for example, less than or equal to 100 nm) and comprises mesopores. As is described herein, in some embodiments, with the presently described zeolite Beta as a bottom-bed hydrocracking catalyst, the 540° C.+ fraction in hydroprocessed Arab light crude can be completely converted to light fractions with a high percentage of paraffin content.

According to one or more embodiments, a nano-sized, mesoporous zeolite particle may comprise a microporous framework comprising a plurality of micropores having diameters of less than or equal to 2 nm and a BEA framework type. The nano-sized, mesoporous zeolite particle may also comprise a plurality of mesopores having diameters of greater than 2 nm and less than or equal to 50 nm. The nano-sized, mesoporous zeolite particle may have a particle size of less than or equal to 100 nm.

According to another embodiment, nano-sized, mesoporous zeolite particles may be synthesized by a method which may comprise combining a first mixture with one or more of a base or cetrimonium bromide to form a second mixture. The first mixture may comprise one or more nano-sized zeolite particles having a particle size of less than or equal to 100 nm. The method may further comprise heating the second mixture to an elevated temperature for a heating time period to form mesopores in the nano-sized zeolite particles In some embodiments, the method may further comprise forming the first mixture by a method comprising combining at least a quaternary ammonium salt, a silica source material, an alumina source material, and water to form a precursor mixture, and autoclaving the precursor mixture to form the nano-sized zeolite particles of the first mixture.

According to another embodiment, a catalyst may comprise one or more nano-sized, mesoporous zeolite particles, a metal oxide support material, and one or more metal catalyst materials. Each of the nano-sized, mesoporous zeolite particles may comprise a microporous framework comprising a plurality of micropores having diameters of less than or equal to 2 nm and a BEA framework type. Each of the nano-sized, mesoporous zeolite particles may also comprise a plurality of mesopores having diameters of greater than 2 nm and less than or equal to 50 nm. The nano-sized, mesoporous zeolite particles may have a particle size of less than or equal to 100 nm.

According to another embodiment, heavy oil may be upgraded by a process which may comprise reducing aromatics content in the heavy oil by contacting the heavy oil with a hydrocracking catalyst comprising one or more nano-sized, mesoporous zeolite particles. Each nano-sized, mesoporous zeolite particle may comprise a microporous framework comprising a plurality of micropores having diameters of less than or equal to 2 nm and a BEA framework type. Each of the nano-sized, mesoporous zeolite particle may also comprise a plurality of mesopores having diameters of greater than 2 nm and less than or equal to 50 nm. The nano-sized, mesoporous zeolite particles may have a particle size of less than or equal to 100 nm.

According to another embodiment, a hydroprocessing system may comprise one or more of a hydrodemetalization catalyst, a transition catalyst, or a hydrodenitrogenation catalyst, and may further comprise a hydrocracking catalyst positioned downstream of the one or more of the hydrodemetalization catalyst, the transition catalyst, or the hydrodenitrogenation catalyst. The hydrocracking catalyst may comprise nano-sized, mesoporous zeolite particles, wherein each nano-sized, mesoporous zeolite particle may comprise a microporous framework comprising a plurality of micropores having diameters of less than or equal to 2 nm and a BEA framework type. Each nano-sized, mesoporous zeolite particle may also comprise a plurality of mesopores having diameters of greater than 2 nm and less than or equal to 50 nm. The nano-sized, mesoporous zeolite particles may have a particle sizes of less than or equal to 100 nm.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
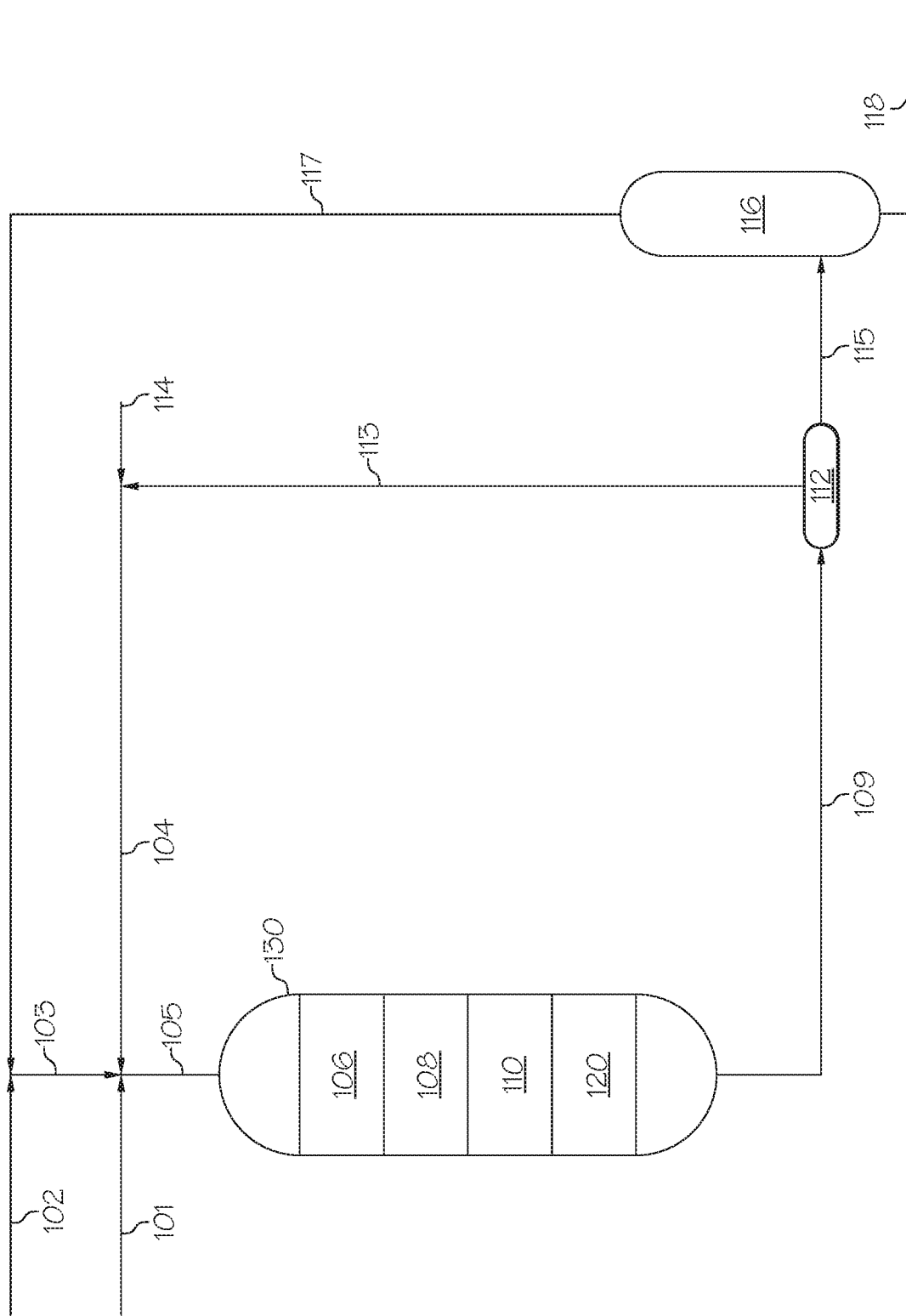
FIG. 1 is a generalized diagram of a chemical pretreatment system which includes a pretreatment reactor comprising a hydrodemetalization (HDM) catalyst, a transition catalyst, a hydrodesulfurization (HDS)/hydrodenitrogenation (HDN) catalyst, and a hydrocracking catalyst, according to one or more embodiments described in this disclosure.
Figure 2:
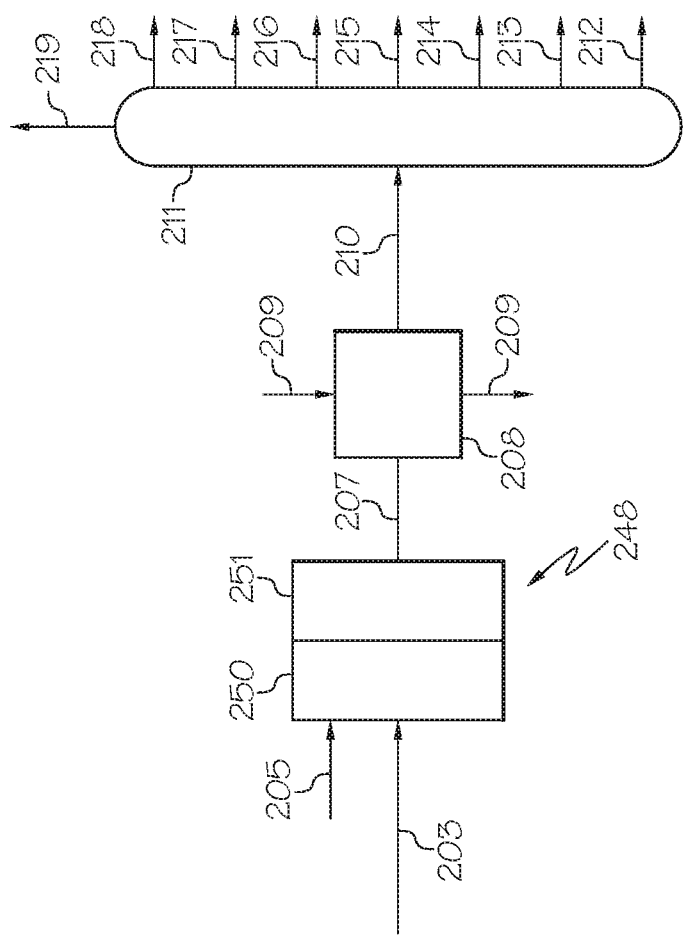
FIG. 2 is a generalized diagram of a chemical processing system utilized subsequent to the chemical pretreatment system of FIG. 1 which includes a steam cracking unit, according to one or more embodiments described in this disclosure.

For the purpose of the simplified schematic illustrations and descriptions of FIGS. 1 and 2, the numerous valves, temperature sensors, electronic controllers and the like that may be employed and well known to those of ordinary skill in the art of certain chemical processing operations are not included. Further, accompanying components that are often included in conventional chemical processing operations, such as refineries, such as, for example, air supplies, catalyst hoppers, and flue gas handling are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Generally described in this disclosure are embodiments of zeolites, such as BEA framework type zeolites such as zeolite Beta, that may be incorporated into hydrotreating catalysts. In some embodiments, the hydrotreating catalysts may be utilized to crack aromatics in heavy oils in a pretreatment process that may take place prior to steam cracking or other downstream processing. The present disclosure also relates to methods for producing such zeolites, as well as the properties and structure of the produced zeolites. According to one or more embodiments, a zeolite composition may comprise a relatively small particle size and may include mesoporosity. Such zeolite materials may be referred to throughout this disclosure as "nano-sized, mesoporous zeolites." As used throughout this disclosure, "zeolites" refer to micropore-containing inorganic materials with regular intra-crystalline cavities and channels of molecular dimension. The microporous structure of zeolites (for example, 0.3 nm to 1 nm pore size) may render large surface areas and desirable size-/shape-selectivity, which may be advantageous for catalysis. The mesoporous zeolites described may include, for example, aluminosilicates, titanosilicates, or pure silicates. In one or more embodiments, the zeolites described may include micropores (present in the microstructure of a zeolite), and additionally include mesopores. As used throughout this disclosure, micropores refer to pores in a zeolitic structure that have a diameter of less than or equal to 2 nm and greater than or equal to 0.1 nm, and mesopores refer to pores in a zeolitic structure that have a diameter of greater than 2 nm and less than or equal to 50 nm. The zeolites presently described may be characterized as Beta (that is, having an aluminosilicate BEA framework type).

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "light fraction" and a "heavy fraction" may exit the separation unit, where, in general, the light fraction stream has a lesser boiling point than the heavy fraction stream.

It should be understood that a "reaction effluent" generally refers to a stream that exits a separation unit, a reactor, or reaction zone following a particular reaction or separation, and generally has a different composition than the stream that entered the separation unit, reactor, or reaction zone.

As used in this disclosure, a "catalyst" refers to any substance which increases the rate of a specific chemical reaction. Catalysts described in this disclosure may be utilized to promote various reactions, such as, but not limited to, hydrodemetalization, hydrodesulfurization, hydrodenitrogenation, aromatic cracking, or combinations thereof. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as an aromatic, to a compound which does not include a cyclic moiety or is more saturated than before reaction.

It should be understood that two or more process stream are "mixed" or "combined" when two or more lines intersect in the schematic flow diagrams of FIGS. 1 and 2. Mixing or combining may also include mixing by directly introducing both streams into a like reactor, separation device, or other system component.

It should be understood that the reactions that are performed by catalysts as described in this disclosure may remove a chemical constituent, such as only a portion of a chemical constituent, from a process stream. For example, a hydrodemetalization (HDM) catalyst may remove a portion of one or more metals from a process stream, a hydrodenitrogenation (HDN) catalyst may remove a portion of the nitrogen present in a process stream, and a hydrodesulfurization (HDS) catalyst may remove a portion of the sulfur present in a process stream. Additionally, a hydrocracking catalyst, such on one with dearomatization (HDA) functionality may reduce the amount of aromatic moieties in a process stream by cracking those aromatic moieties. It should be understood that, throughout this disclosure, a particular catalyst is not necessarily limited in functionality to the removal or cracking of a particular chemical constituent or moiety when it is referred to as having a particular functionality. For example, a catalyst identified in this disclosure as an HDN catalyst may additionally provide hydrocracking functionality, HDA functionality, HDS functionality, or combinations thereof.

It should further be understood that streams may be named for the components of the stream, and the component for which the stream is named may be the major component of the stream (such as comprising from 50 wt. %, from 70 wt. %, from 90 wt. %, from 95 wt. %, or even from 95 wt. % of the contents of the stream to 100 wt. % of the contents of the stream).

According to one or more embodiments, the nano-sized, mesoporous zeolite may be characterized as mesoporous by having average pore size of from 2 nm to 50 nm. By way of comparison, conventional zeolites that may be utilized in hydrocracking catalysts contain zeolites which are microporous, meaning that they have an average pore size of less than 2 nm, but may not include mesopores. According to one or more embodiments, the nano-sized, mesoporous zeolite Beta presently disclosed may have an average pore size of from 2 nm to 25 nm, from 4 nm to 20 nm, from 5 nm to 15, from 5 nm to 10 nm, or from 10 nm to 15 nm. It should be understood that pore size, as used throughout this disclosure, relates to the average pore size unless specified otherwise. The average pore size may be determined from a nitrogen physisorption analysis. Further, the average pore size may be confirmed by transmission electron microscope (TEM) characterization.

In additional embodiments, the nano-sized, mesoporous zeolites described herein may have a pore volume of from 0.5 to 1.0 mL/g. For example, embodiments of the nano-sized, mesoporous zeolite Beta may have a pore volume of from 0.5 to 0.6 mL/g, from 0.5 to 0.7 mL/g, from 0.5 to 0.8 mL/g, from 0.5 to 0.9 mL/g, from 0.6 mL/g to 1.0 mL/g, from 0.7 mL/g to 1.0 mL/g, from 0.8 mL/g to 1.0 mL/g, or from 0.9 mL/g to 1.0 mL/g. As used in this disclosure, "pore volume" refers to the total pore volume measured.

In additional embodiments, the nano-sized, mesoporous zeolites described herein may have a surface area of from 500 m²/g to 700 m²/g. For example, embodiments of the nano-sized, mesoporous zeolite Beta may have a surface area of from 500 m²/g to 550 m²/g, from 500 m²/g to 600 m²/g, from 500 m²/g to 650 m²/g, from 550 m²/g to 700 m²/g, from 600 m²/g to 700 m²/g, or from 650 m²/g to 700 m²/g.

Without being bound they theory, it is believed that the relatively large pore size (that is, mesoporosity) of the presently described nano-sized, mesoporous zeolites and hydrocracking catalysts that include the nano-sized, mesoporous zeolites allows for larger molecules to diffuse inside the zeolite, which is believed to enhance the reaction activity and selectivity of the catalyst. With the increased pore size, aromatic containing molecules can more easily diffuse into the catalyst and aromatic cracking may be increased. For example, in some conventional embodiments, the feedstock converted by the hydroprocessing catalysts may be vacuum gas oils, light cycle oils from, for example, a fluid catalytic cracking reactor, or coker gas oils from, for example, a coking unit. The molecular sizes in these oils are relatively small compared to those of heavy oils such as crude and atmosphere residue, which may be the feedstock of the presently described methods and systems. The heavy oils generally are not able to diffuse inside the conventional zeolites to be converted on the active sites located inside the zeolites. Therefore, zeolites with larger pore sizes (that is, mesoporous zeolites) may make the larger molecules of heavy oils overcome the diffusion limitation, and may make possible reaction and conversion of the larger molecules of the heavy oils.

In addition to comprising mesopores, the presently described zeolite may have a particle size of less than or equal to 100 nm (i.e., be nano-sized). As described herein, "nano-sized" zeolites or particles refer to those with particles sizes of less than or equal to 100 nm. The nano-sized, mesoporous zeolite Beta described herein may form as particles that may be generally spherical in shape or irregular globular shaped (that is, non-spherical). In embodiments, the particles have a "particle size" measured as the greatest distance between two points located on a single zeolite particle. For example, the particle size of a spherical particle is equal to its diameter. In other shapes, the particle size is measured as the distance between the two most distant points of the same particle, where these points may lie on outer surfaces of the particle. The particles may have a particle size from 10 nm to 100 nm, from 20 nm to 100 nm, from 30 nm to 100 nm, from 40 nm to 100 nm, from 50 nm to 100 nm, from 60 nm to 100 nm, from 70 nm to 100 nm, from 80 nm to 100 nm, from 90 nm to 100 nm, from 10 nm to 80 nm, from 10 nm to 70 nm, from 10 nm to 60 nm, from 10 nm to 50 nm, from 10 nm to 40 nm, from 10 nm to 30 nm, or from 10 nm to 20 nm. Without being bound by theory, it is believed that the relatively small particle size allows for easier access by the molecules in heavy oil to active sites on the zeolite. For example, the increased external surface area may be caused by the small particle size, which may increase catalytic activity.

It should be understood that the catalysts containing the nano-sized, mesoporous zeolite particles may also include zeolites which are either non nano-sized (i.e., greater than 100 nm), do not contain mesopores, or both. Accordingly, it should be understood that "nano-sized, mesoporous zeolite particles" refer to zeolites that have a particle size of less than or equal to 100 nm and contain mesopores, and do not include other zeolites which do not have these features. For example, when it is said that the nano-sized, mesoporous zeolite particles have a particle size of less than or equal to 100 nm, this statement only refers to the nano-sized zeolites with particle sizes of less than or equal to 100 nm, and does not describe other zeolite that may be present with a particle size of greater than 100 nm.

The presently described nano-sized, mesoporous zeolite materials may be produced by a process which comprises several fabrication steps which may include one or more of forming or otherwise providing nano-sized zeolite Beta in a colloidal mixture, treating the nano-sized zeolite particles with a base, such as a basic aqueous solution comprising, for example, NaOH or ammonia, and/or treating the nano-sized zeolite particles with cetrimonium bromide ("CTAB") to form mesopores, and subsequently separating the nano-sized, mesoporous zeolite Beta particles by processes such as washing, drying, calcining, etc.

In one or more embodiments, the synthesis process for forming the nano-sized, mesoporous zeolite may begin by the step of providing a nano-sized zeolite crystalline particles. The nano-sized zeolite crystals may be in a colloidal mixture. The step of providing a colloidal mixture comprising nano-sized zeolite particles may include processes such as, but not limited to, fabricating the nano-sized zeolite particles in a colloidal mixture or directly acquiring such a colloidal mixture comprising nano-sized zeolite particles. It should be understood that numerous methods may be available for fabricating a colloidal mixture containing nano-sized zeolite particles, and that methods not explicitly described for fabricating a colloidal mixture containing nano-sized zeolite particles are contemplated in this disclosure. As used in this disclosure, a "colloidal mixture" refers to a mixture of at least two materials where the mixture has a state of subdivision such that the molecules or polymolecular particles dispersed in a medium have at least one dimension between approximately 1 nm and 1 micron (μm).

According to one or more embodiments for providing the colloidal mixture comprising nano-sized zeolite particles, the colloidal mixture comprising nano-sized zeolite particles may be produced by mixing at least a quaternary ammonium salt, silica source material, alumina source material, and water, and autoclaving the mixture containing at least the quaternary ammonium salt, silica source material, alumina source material, and water to form nano-sized zeolite crystals in a colloidal mixture. In one embodiment, the quaternary ammonium salt may be tetraethylammonium hydroxide (TEAOH). According to one or more embodiments, the mixture containing at least a quaternary ammonium salt, silica source material, alumina source material, and water may have a molar ratio of these contents of 1 mole of alumina source material, from 15 moles to 40 moles of quaternary ammonium salt (such as from 15 moles to 30 moles, or from 30 moles to 40 moles), from 20 moles to 500 moles of silica source material (such as from 20 moles to 250 moles, or from 250 moles to 500 moles), and from 500 moles to 1000 moles of water (such as from 500 moles to 750 moles, or from 750 moles to 100 moles). According to one embodiment, the mixture containing at least the quaternary ammonium salt, silica source material, alumina source material, and water, as described previously in this disclosure, may be autoclaved for 1 to 7 days at, for example, 40 rotations per minute (rpm) to 80 rpm (such as 60 rpm) at 100 degrees Celsius (° C.) to 150° C. (such as from 130° C. to 150° C., or 140° C.) to form the nano-sized zeolite crystals. Prior to autoclaving, the mixture containing at least a quaternary ammonium salt, silica source material, alumina source material, and water may be aged, such as by stirring for 4 hours at room temperature. It should be understood that the described autoclaving and aging steps may be modified to some degree depending upon the exact components of the mixture that is autoclaved and the desired zeolite crystal structure to be formed.

In one or more embodiments, the mixture containing the nano-sized zeolite crystals is combined with one or more of a base, such as a basic aqueous solution (for example, containing NaOH or ammonia) and cetrimonium bromide, forming a second mixture. For example, the base aqueous solution (for example, NaOH or ammonia in water) may be added to the mixture containing the nano-sized zeolite crystals, and then cetrimonium bromide may be subsequently added. In one or more embodiments, the basic aqueous solution concentration may be from 0.05 M to 2 M of the base, and the weight ratio of cetrimonium bromide to zeolite may be from 0.1 to 1.5. This second mixture may then be heated to an elevated temperature for a heating time period to form mesopores in the nano-sized zeolite crystals. For example, the elevated temperature may be from 100° C. to 150° C. and the heating time period may be from 1 to 5 days. The nano-sized zeolite crystals may then be separated from the other contents of the second mixture to produce pure or nearly pure nano-sized, mesoporous zeolite Beta particles suitable for use in fabricating a catalyst. According to one or more embodiments, the separation may comprise a solids/liquids separation technique (for example, centrifugation, filtering, etc.), followed by washing with water, drying at, for example 100° C. for a period of several hours, and then calcination by exposure to temperatures of at least 400° C., such as 500° C. to 600° C., for several hours, such as 3 hours to 6 hours.

According to one or more embodiments described herein, CTAB, the base, or both, may be added directly to the first mixture. Therefore, the presently disclosed process may not separate, wash, dry, and calcine the produced zeolite particles as is necessary in some conventional zeolite fabrication methods. This aspect may reduce synthesis costs. In additional embodiments, the presently disclosed process may not utilize pH adjusting materials such as acetic acid in the mesopore production step, as is sometimes necessary in fabricating mesopores by conventional techniques.

According to one or more embodiments, the nano-sized, mesoporous zeolite Beta presently disclosed may be incorporated into a catalyst. The catalyst may be utilized as a hydrocracking catalyst in the pretreatment of heavy oils, as described subsequently in detail. As such, the catalysts which includes the nano-sized, mesoporous zeolite Beta may be referred to herein as a "hydrocracking catalyst." However, it should be understood that, while the hydrocracking catalysts are described in the context of pretreatment (for example, hydrotreatment) of a heavy oil, the hydrocracking catalysts described herein may be useful for other catalytic reactions for the production of other petrochemical product.

In one or more embodiments, the hydrocracking catalyst may comprise the presently described nano-sized, mesoporous zeolite particles, one or more metal oxide support materials, and one or more metal catalysts. The hydrocracking catalysts presently described may have a material composition comprising from 10 wt. % to 80 wt. % of one or more metal oxide support materials (for example, alumina), from 18 wt. % to 32 wt. % of metal catalyst material, and from 10 wt. % to 60 wt. % of the nano-sized, mesoporous zeolite particles.

The metal catalyst material may comprise one or more metals from IUPAC Groups 5, 6, 8, 9, or 10 of the periodic table. For example, the hydrocracking catalyst may comprise one or more metals from IUPAC Groups 5 or 6, and one or more metals from IUPAC Groups 8, 9, or 10 of the periodic table. For example, the hydrocracking catalyst may comprise molybdenum or tungsten from IUPAC Group 6 and nickel or cobalt from IUPAC Groups 8, 9, or 10. In one embodiment, the hydrocracking catalyst may comprise tungsten and nickel metal catalyst. In another embodiment, the hydrocracking catalyst may comprise molybdenum and nickel metal catalyst. For example, in one embodiment, the hydrocracking catalyst may comprise from 20 wt. % to 26 wt. % of a sulfide or oxide of tungsten, from 4 wt. % to 6 wt. % of an oxide or sulfide of nickel, from 10 wt. % to 70 wt. % of a metal oxide support material such as alumina, and from 10 wt. % to 60 wt. % of nano-sized, mesoporous zeolite Beta. In another embodiment, the hydrocracking catalyst may comprise from 14 wt. % to 16 wt. % of an oxide or sulfide of molybdenum, from 4 wt. % to 6 wt. % of an oxide or sulfide of nickel, from 20 wt. % to 80 wt. % of a metal oxide support material such as alumina, and from 10 wt. % to 60 wt. % of nano-sized, mesoporous zeolite Beta.

The hydrocracking catalysts described may be fabricated by providing the nano-sized, mesoporous zeolite particles and impregnating the nano-sized, mesoporous zeolite particles with one or more catalytic metals or by comulling mesoporous zeolite with other components. In one embodiment, the mesoporous zeolite, active alumina (for example, boehmite alumina), and binder (for example, acid peptized alumina) may be mixed. An appropriate amount of water may be added to form a dough that can be extruded using an extruder. The extrudate may be dried at 80° C. to 120° C. for 4 hours to 10 hours, and then calcinated at 500° C. to 600° C. for 4 hours to 6 hours. To this alumina support material which includes the nano-sized, mesoporous zeolite may then be added the metal catalyst material such as oxide or sulfides of Mo, Ni, W, or Ni. For example, in one embodiment, the support material may be impregnated with one or more metals to form the hydrocracking catalyst. According to described embodiments, the impregnation of the support material may comprise contacting the support material with a solution comprising one or more metal catalyst precursors. For example, the support material may be submerged in the solution comprising the one or more metal catalyst precursors, an impregnation method sometimes referred to as a saturated impregnation. In embodiments of saturated impregnation, the support may be submerged in an amount of solution comprising the metal catalyst precursors 2 to 4 times of that which is absorbed by the support, and the remaining solution is subsequently removed. According to another embodiment, the impregnation may be by incipient wetness impregnation, sometimes referred to as capillary impregnation or dry impregnation. In embodiments of incipient wetness impregnation, the metal catalyst precursor containing solution is contacted with the support, where the amount of solution is approximately equal to the pore volume of the support and capillary action may draw the solution into the pores. After the contacting of the support material with the solution, the support material may be calcined at a temperature of at least 500° C. (such as from 500° C. to 600° C.) for a time of at least 3 hours (such as 3 hours to 6 hours). For example, the calcining may be at a temperature of 500° C. for 4 hours. Generally, the impregnation process will allow for attachment of the metal catalyst onto the support materials (that is, the zeolite and metal oxide support). The metal catalyst precursors may include one or more of Ni, W, Mo, Co, and following the impregnation, are present on the catalyst support as compounds comprising Ni, W, Mo, Co, or combinations thereof. Two or more metal catalyst precursors may be utilized when two metal catalysts are desired. However, some embodiments may include only one of Ni, W, Mo, or Co. For example, the catalyst support material may be impregnated by a mixture of nickel nitrate hexahydrate (that is, $Ni(NO_3)_2 \cdot 6H_2O$) and ammonium metatungstate (that is, $(NH_4)_6H_2W_{12}O_{40}$) if a W—Ni catalyst is desired. While it should be understood that the scope of the present disclosure should not be limited by the metal catalyst precursor selected, other suitable metal catalyst precursors may include cobalt nitrate hexahydrate $(Co(NO_3)_2 \cdot 6H_2O)$, ammonia heptamolybdate $((NH_4)_6Mo_7O_{24} \cdot 4H_2O)$, or ammonium molybdate $((NH_4)_2MoO_4)$. Following impregnation, the impregnated metal catalysts may be present as a metal oxide, such as $WO_3$, $MoO_3$, NiO, and CoO, and are referred to in this disclosure as "metal catalyst materials." While these metal catalyst materials may include metal oxides, it should be appreciated that the metal catalyst materials are distinct from the metal oxide support material of the catalyst which may, in some embodiments, be alumina.

As described herein, the nano-sized, mesoporous zeolite Beta may be utilized as a hydrocracking catalyst in the upgrading processing of heavy oils, such as crude oil. Such upgrading processes may be a pretreatment step prior to other petrochemical processing such as refining operations utilizing, for example, one or more of steam cracking, hydrocracking, thermal cracking, or fluid catalytic cracking. Generally, the upgrading process may remove one or more of at least a portion of nitrogen, sulfur, and one or more metals from the heavy oil, and may additionally break aromatic moieties in the heavy oil. According to one or more embodiments, the heavy oil may be treated with a hydrodemetalization catalyst (referred to sometimes in this disclosure as an "HDM catalyst"), a transition catalyst, a hydrodenitrogenation catalyst (referred to sometimes in this disclosure as an "HDN catalyst"), and a hydrocracking catalyst. The HDM catalyst, transition catalyst, HDN catalyst, and hydrocracking catalyst may be positioned in series, either contained in a single reactor, such as a packed bed reactor with multiple beds, or contained in two or more reactors arranged in series.

Referring now to FIG. 1, a pretreatment system is schematically depicted which includes one or more of an HDM reaction zone 106, a transition reaction zone 108, a HDN reaction zone 110, and a hydrocracking reaction zone 120. According to embodiments of this disclosure, a heavy oil feed stream 101 may be mixed with a hydrogen stream 104. The hydrogen stream 104 may comprise unspent hydrogen gas from recycled process gas component stream 113, make-up hydrogen from hydrogen feed stream 114, or both, to form a pretreatment catalyst input stream 105. In one or more embodiments, pretreatment catalyst input stream 105 may be heated to a process temperature of from 350 degrees Celsius (° C.) to 450° C. The pretreatment catalyst input stream 105 may enter and pass through a series of reaction zones, including the HDM reaction zone 106, the transition reaction zone 108, the HDN reaction zone 110, and a hydrocracking reaction zone 120. The HDM reaction zone 106 comprises an HDM catalyst, the transition reaction zone 108 comprises a transition catalyst, the HDN reaction zone 110 comprises an HDN catalyst, and a hydrocracking reaction zone 120 comprises the hydrocracking catalyst comprising the nano-sized, mesoporous zeolite.

The systems and processes described are applicable for a wide variety of heavy oil feeds (in heavy oil feed stream 101), including crude oils, vacuum residue, tar sands, bitumen and vacuum gas oils using a catalytic hydrotreating pretreatment process. For example, when the heavy oil feed is crude oil, it may have an American Petroleum Institute (API) gravity of greater than or equal to 25 degrees, such as from 25 degrees to 50 degrees, from 25 degrees to 30 degrees, from 30 degrees to 35 degrees, from 35 degrees to 40 degrees, from 40 degrees to 45 degrees, from 45 degrees to 50 degrees, or any combination of these ranges. For example, the heavy oil feed utilized may be Arab heavy crude oil or Arab light crude oil. By way of example, the typical properties for an Arab heavy crude oil are shown in Table 1.

TABLE 1

Arab Heavy Export Feedstock

| | Units | Value |
|---|---|---|
| Analysis | | |
| American Petroleum Institute (API) gravity | degree | 27 |
| Density | grams per cubic centimeter ($g/cm^3$) | 0.8904 |
| Sulfur Content | Weight percent (wt. %) | 2.83 |
| Nickel | Parts per million by weight (ppmw) | 16.4 |
| Vanadium | ppmw | 56.4 |
| NaCl Content | ppmw | <5 |
| Conradson Carbon Residue (CCR) | wt. % | 8.2 |
| C5 Asphaltenes | wt. % | 7.8 |
| C7 Asphaltenes | wt. % | 4.2 |

Referring still to FIG. 1, a pretreatment system is depicted which is an example of a system in which the nano-sized, mesoporous zeolites described herein may be utilized. According to the embodiment of FIG. 1, pretreatment catalyst input stream 105 may be introduced to pretreatment reactor 130. According to one or more embodiments, the pretreatment reactor 130 may comprise multiple reactions zones arranged in series (for example, the HDM reaction zone 106, the transition reaction zone 108, the HDN reaction zone 110, and a hydrocracking reaction zone 120) and each of these reaction zones may comprise a catalyst bed. In such an embodiment, the pretreatment reactor 130 comprises an HDM catalyst bed comprising an HDM catalyst in the HDM reaction zone 106, a transition catalyst bed comprising a transition catalyst in the transition reaction zone 108, an HDN catalyst bed comprising an HDN catalyst in the HDN reaction zone 110, and a hydrocracking catalyst bed comprising a hydrocracking catalyst in the hydrocracking reaction zone 120.

According to one or more embodiments, the pretreatment catalyst input stream 105, which comprises heavy oil, is introduced to the HDM reaction zone 106 and is contacted by the HDM catalyst. Contact by the HDM catalyst with the pretreatment catalyst input stream 105 may remove at least a portion of the metals present in the pretreatment catalyst input stream 105. Following contact with the HDM catalyst, the pretreatment catalyst input stream 105 may be converted to an HDM reaction effluent. The HDM reaction effluent may have a reduced metal content as compared to the contents of the pretreatment catalyst input stream 105. For example, the HDM reaction effluent may have at least 70 wt. % less, at least 80 wt. % less, or even at least 90 wt. % less metal as the pretreatment catalyst input stream 105.

According to one or more embodiments, the HDM reaction zone 106 may have a weighted average bed temperature of from 350° C. to 450° C., such as from 370° C. to 415° C., and may have a pressure of from 30 bars to 200 bars, such as from 90 bars to 110 bars. The HDM reaction zone 106 comprises the HDM catalyst, and the HDM catalyst may fill the entirety of the HDM reaction zone 106.

The HDM catalyst may comprise one or more metals from the International Union of Pure and Applied Chemistry (IUPAC) Groups 5, 6, or 8-10 of the periodic table. For example, the HDM catalyst may comprise molybdenum. The HDM catalyst may further comprise a support material, and the metal may be disposed on the support material. In one embodiment, the HDM catalyst may comprise a molybdenum metal catalyst on an alumina support (sometimes referred to as "Mo/$Al_2O_3$ catalyst"). It should be understood throughout this disclosure that metals that are contained in any of the disclosed catalysts may be present as sulfides or oxides, or even other compounds.

In one embodiment, the HDM catalyst may include a metal sulfide on a support material, where the metal is selected from the group consisting of IUPAC Groups 5, 6, and 8-10 elements of the periodic table, and combinations thereof. The support material may be gamma-alumina or silica/alumina extrudates, spheres, cylinders, beads, pellets, and combinations thereof.

In one embodiment, the HDM catalyst may comprise a gamma-alumina support, with a surface area of from 100 $m^2/g$ to 160 $m^2/g$ (such as, from 100 $m^2/g$ to 130 $m^2/g$, or form 130 $m^2/g$ to 160 $m^2/g$). The HDM catalyst can be best described as having a relatively large pore volume, such as at least 0.8 $cm^3/g$ (for example, at least 0.9 $cm^3/g$, or even at least 1.0 $cm^3/g$. The pore size of the HDM catalyst may be predominantly macroporous (that is, having a pore size of greater than 50 nm). This may provide a large capacity for the uptake of metals on the HDM catalyst's surface and optionally dopants. In one embodiment, a dopant can be selected from the group consisting of boron, silicon, halogens, phosphorus, and combinations thereof.

In one or more embodiments, the HDM catalyst may comprise from 0.5 wt. % to 12 wt. % of an oxide or sulfide of molybdenum (such as from 2 wt. % to 10 wt. % or from 3 wt. % to 7 wt. % of an oxide or sulfide of molybdenum), and from 88 wt. % to 99.5 wt. % of alumina (such as from 90 wt. % to 98 wt. % or from 93 wt. % to 97 wt. % of alumina).

Without being bound by theory, in some embodiments, it is believed that during the reaction in the HDM reaction zone 106, porphyrin type compounds present in the heavy oil are first hydrogenated by the catalyst using hydrogen to create an intermediate. Following this primary hydrogenation, the nickel or vanadium present in the center of the porphyrin molecule is reduced with hydrogen and then further reduced to the corresponding sulfide with hydrogen sulfide ($H_2S$). The final metal sulfide is deposited on the catalyst thus removing the metal sulfide from the virgin crude oil. Sulfur is also removed from sulfur containing organic compounds. This is performed through a parallel pathway. The rates of these parallel reactions may depend upon the sulfur species being considered. Overall, hydrogen is used to abstract the sulfur which is converted to $H_2S$ in the process. The remaining, sulfur-free hydrocarbon fragment remains in the liquid hydrocarbon stream.

The HDM reaction effluent may be passed from the HDM reaction zone 106 to the transition reaction zone 108 where it is contacted by the transition catalyst. Contact by the transition catalyst with the HDM reaction effluent may remove at least a portion of the metals present in the HDM reaction effluent stream as well as may remove at least a portion of the nitrogen present in the HDM reaction effluent stream. Following contact with the transition catalyst, the HDM reaction effluent is converted to a transition reaction effluent. The transition reaction effluent may have a reduced metal content and nitrogen content as compared to the HDM reaction effluent. For example, the transition reaction effluent may have at least 1 wt. % less, at least 3 wt. % less, or even at least 5 wt. % less metal content as the HDM reaction effluent. Additionally, the transition reaction effluent may have at least 10 wt. % less, at least 15 wt. % less, or even at least 20 wt. % less nitrogen as the HDM reaction effluent.

According to embodiments, the transition reaction zone 108 has a weighted average bed temperature of 370° C. to 440° C. The transition reaction zone 108 comprises the transition catalyst, and the transition catalyst may fill the entirety of the transition reaction zone 108.

In one embodiment, the transition reaction zone 108 may be operable to remove a quantity of metal components and a quantity of sulfur components from the HDM reaction effluent stream. The transition catalyst may comprise an alumina based support in the form of extrudates.

In one embodiment, the transition catalyst comprises one metal from IUPAC Group 6 and one metal from IUPAC Groups 8-10. Example IUPAC Group 6 metals include molybdenum and tungsten. Example IUPAC Group 8-10 metals include nickel and cobalt. For example, the transition catalyst may comprise Mo and Ni on a titania support (sometimes referred to as "Mo—Ni/$Al_2O_3$ catalyst"). The transition catalyst may also contain a dopant that is selected from the group consisting of boron, phosphorus, halogens, silicon, and combinations thereof. The transition catalyst can have a surface area of 140 $m^2/g$ to 200 $m^2/g$ (such as from 140 $m^2/g$ to 170 $m^2/g$ or from 170 $m^2/g$ to 200 $m^2/g$). The transition catalyst can have an intermediate pore volume of from 0.5 $cm^3/g$ to 0.7 $cm^3/g$ (such as 0.6 $cm^3/g$). The transition catalyst may generally comprise a mesoporous structure having pore sizes in the range of 12 nm to 50 nm. These characteristics provide a balanced activity in HDM and HDS.

In one or more embodiments, the transition catalyst may comprise from 10 wt. % to 18 wt. % of an oxide or sulfide of molybdenum (such as from 11 wt. % to 17 wt. % or from 12 wt. % to 16 wt. % of an oxide or sulfide of molybdenum), from 1 wt. % to 7 wt. % of an oxide or sulfide of nickel (such as from 2 wt. % to 6 wt. % or from 3 wt. % to 5 wt. % of an oxide or sulfide of nickel), and from 75 wt. % to 89 wt. % of alumina (such as from 77 wt. % to 87 wt. % or from 79 wt. % to 85 wt. % of alumina).

The transition reaction effluent may be passed from the transition reaction zone 108 to the HDN reaction zone 110 where it is contacted by the HDN catalyst. Contact by the HDN catalyst with the transition reaction effluent may remove at least a portion of the nitrogen present in the transition reaction effluent stream. Following contact with the HDN catalyst, the transition reaction effluent may be converted to an HDN reaction effluent. The HDN reaction effluent may have a reduced metal content and nitrogen content as compared to the transition reaction effluent. For example, the HDN reaction effluent may have a nitrogen content reduction of at least 80 wt. %, at least 85 wt. %, or even at least 90 wt. % relative to the transition reaction effluent. In another embodiment, the HDN reaction effluent may have a sulfur content reduction of at least 80 wt. %, at least 90 wt. %, or even at least 95 wt. % relative to the transition reaction effluent. In another embodiment, the HDN reaction effluent may have an aromatics content reduction of at least 25 wt. %, at least 30 wt. %, or even at least 40 wt. % relative to the transition reaction effluent.

According to embodiments, the HDN reaction zone 110 may have a weighted average bed temperature of from 370° C. to 440° C. The HDN reaction zone 110 may comprise the HDN catalyst, and the HDN catalyst may fill the entirety of the HDN reaction zone 110.

In one or more embodiments, the HDN catalyst may include a metal oxide or sulfide on a support material, where the metal is selected from the group consisting of IUPAC Groups 5, 6, and 8-10 of the periodic table, and combinations thereof. The support material may include gamma-alumina, meso-porous alumina, silica, or both, in the form of extrudates, spheres, cylinders and pellets.

According to one or more embodiments, the HDN catalyst may contain a gamma alumina based support that has a surface area of 180 $m^2$/g to 240 $m^2$/g (such as from 180 $m^2$/g to 210 $m^2$/g, or from 210 $m^2$/g to 240 $m^2$/g). This relatively large surface area for the HDN catalyst may allow for a smaller pore volume (for example, less than 1.0 $cm^3$/g, less than 0.95 $cm^3$/g, or even less than 0.9 $cm^3$/g). In one embodiment, the HDN catalyst contains at least one metal from IUPAC Group 6, such as molybdenum and at least one metal from IUPAC Groups 8-10, such as nickel. The HDN catalyst can also include at least one dopant selected from the group consisting of boron, phosphorus, silicon, halogens, and combinations thereof. In one or more embodiments, cobalt can be used to increase desulfurization of the HDN catalyst. In one or more embodiments, the HDN catalyst has a higher metals loading for the active phase as compared to the HDM catalyst. This increased metals loading may cause increased catalytic activity. In one or more embodiments, the HDN catalyst comprises nickel and molybdenum, and has a nickel to molybdenum mole ratio (Ni/(Ni+Mo)) of 0.1 to 0.3 (such as from 0.1 to 0.2 or from 0.2 to 0.3). In an embodiment that includes cobalt, the mole ratio of (Co+Ni)/Mo may be in the range of 0.25 to 0.85 (such as from 0.25 to 0.5 or from 0.5 to 0.85).

According to embodiments presently described, the HDN catalyst may be produced by mixing a support material, such as alumina, with a binder, such as acid peptized alumina. Water or another solvent may be added to the mixture of support material and binder to form an extrudable phase, which is then extruded into a desired shape. The extrudate may be dried at an elevated temperature (such as above 100° C., such as 110° C.) and then calcined at a suitable temperature (such as at a temperature of at least 400° C., at least 500° C., such as 550° C.). The calcined extrudates may be impregnated with an aqueous solution containing catalyst precursor materials, such as precursor materials which include Mo, Ni, or combinations thereof. For example, the aqueous solution may contain ammonium heptanmolybdate, nickel nitrate, and phosphoric acid to form an HDN catalyst comprising compounds comprising molybdenum, nickel, and phosphorous.

According to one or more embodiments, the HDN catalyst may comprise from 10 wt. % to 18 wt. % of an oxide or sulfide of molybdenum (such as from 13 wt. % to 17 wt. % or from 14 wt. % to 16 wt. % of an oxide or sulfide of molybdenum), from 2 wt. % to 8 wt. % of an oxide or sulfide of nickel (such as from 3 wt. % to 7 wt. % or from 4 wt. % to 6 wt. % of an oxide or sulfide of nickel), and from 74 wt. % to 88 wt. % of alumina (such as from 76 wt. % to 84 wt. % or from 78 wt. % to 82 wt. % of alumina).

In a similar manner to the HDM catalyst, and again not intending to be bound to any theory, it is believed that hydrodenitrogenation and hydrodearomatization may operate via related reaction mechanisms. Both may involve some degree of hydrogenation. For the hydrodenitrogenation, organic nitrogen compounds are usually in the form of heterocyclic structures, the heteroatom being nitrogen. These heterocyclic structures may be saturated prior to the removal of the heteroatom of nitrogen. Similarly, hydrodearomatization involves the saturation of aromatic rings. Each of these reactions may occur to a differing amount on each of the catalyst types as the catalysts are selective to favor one type of transfer over others and as the transfers are competing.

Still referring to FIG. 1, the HDN reaction effluent may be passed from the HDN reaction zone 110 to the hydrocracking reaction zone 120 where it is contacted by the hydrocracking catalyst, described above. Contact by the hydrocracking catalyst with the HDN reaction effluent may reduce aromatic content present in the HDN reaction effluent. Following contact with the hydrocracking catalyst, the HDN reaction effluent is converted to a pretreatment catalyst reaction effluent stream 109. The pretreatment catalyst reaction effluent stream 109 may have reduced aromatics content as compared to the HDN reaction effluent. For example, the pretreatment catalyst reaction effluent stream 109 may have at least 50 wt. % less, at least 60 wt. % less, or even at least 80 wt. % less aromatics content as the HDN reaction effluent.

According to one or more embodiments described, the volumetric ratio of HDM catalyst:transition catalyst:HDN catalyst:hydrocracking catalyst may be 5-20:5-30:30-70:5-30 (such as a volumetric ratio of 5-15:5-15:50-60:15-20, or approximately 10:10:60:20.) The ratio of catalysts may depend at least partially on the metal content in the oil feedstock processed.

Still referring to FIG. 1, pretreatment catalyst reaction effluent stream 109 may enter a separation unit 112 and may be separated into recycled process gas component stream 113 and intermediate liquid product stream 115. In one embodiment, the pretreatment catalyst reaction effluent stream 109 may also be purified to remove hydrogen sulfide and other process gases to increase the purity of the hydrogen to be recycled in recycled process gas component stream 113. The hydrogen consumed in the process can be compensated for by the addition of a fresh hydrogen from hydrogen feed stream 114, which may be derived from a steam or naphtha reformer or other source. Recycled process gas component stream 113 and fresh make-up hydrogen feed stream 114 may combine to form hydrogen stream 104. In one embodiment, intermediate liquid product stream 115 from the process can be flashed in flash vessel 116 to separate light hydrocarbon fraction stream 117 and pretreatment final liquid product stream 118; however, it should be understood that this flashing step is optional. In one embodiment, light hydrocarbon fraction stream 117 acts as a recycle and is mixed with fresh light hydrocarbon diluent stream 102 to create light hydrocarbon diluent stream 103. Fresh light hydrocarbon diluent stream 102 can be used to provide make-up diluent to the process as needed in order to help further reduce the deactivation of one or more of the catalysts in the pretreatment reactor 130.

In one or more embodiments, one or more of the pretreatment catalyst reaction effluent stream 109, the intermediate liquid product stream 115, and the pretreatment final liquid product stream 118 may have reduced aromatic content as compared with the heavy oil feed stream 101. Additionally, in embodiments, one or more of the pretreatment catalyst reaction effluent stream 109, the intermediate liquid product stream 115, and the pretreatment final liquid product stream 118 may have significantly reduced sulfur, metal, asphaltenes, Conradson carbon, nitrogen content, or combinations thereof, as well as an increased API and increased naphtha, middle and vacuum distillate yields in comparison with the heavy oil feed stream 101.

According to one or more embodiments, the pretreatment catalyst reaction effluent stream 109 may have a reduction of at least 80 wt. %, a reduction of at least 90 wt. %, or even a reduction of at least 95 wt. % of nitrogen with respect to the heavy oil feed stream 101. According to another embodiment, the pretreatment catalyst reaction effluent stream 109 may have a reduction of at least 85 wt. %, a reduction of at least 90 wt. %, or even a reduction of at least 99 wt. % of sulfur with respect to the heavy oil feed stream 101. According to another embodiment, the pretreatment catalyst reaction effluent stream 109 may have a reduction of at least 70 wt. %, a reduction of at least 80 wt. %, or even a reduction of at least 85 wt. % of aromatic content with respect to the heavy oil feed stream 101. According to another embodiment, the pretreatment catalyst reaction effluent stream 109 may have a reduction of at least 80 wt. %, a reduction of at least 90 wt. %, or even a reduction of at least 99 wt. % of metal with respect to the heavy oil feed stream 101.

Still referring to FIG. 1, in various embodiments, one or more of the pretreatment catalyst reaction effluent stream 109, the intermediate liquid product stream 115, and the pretreatment final liquid product stream 118 may be suitable for use as the upgraded fuel stream 203 of a refining process such as shown in FIG. 2, as described subsequently in this disclosure. As used in this disclosure, one or more of the pretreatment catalyst reaction effluent stream 109, the intermediate liquid product stream 115, and the pretreatment final liquid product stream 118 may be referred to as an "upgraded fuel" which may be downstream processed by refining as described with reference to FIG. 2.

Now referring to FIG. 2, a steam cracking and separation system is depicted. The upgraded fuel stream 203 may be passed to a steam cracker unit 248. The steam cracker unit 248 may include a convection zone 250 and a pyrolysis zone 251. The lesser boiling point fuel fraction stream 203 may pass into the convection zone 250 along with steam 205. In the convection zone 250, the upgraded fuel stream 203 may be pre-heated to a desired temperature, such as from 400° C. to 650° C. The contents of the upgraded fuel stream 203 present in the convection zone 250 may then be passed to the pyrolysis zone 251 where it is steam-cracked. The steam-cracked effluent stream 207 may exit the steam cracker unit 248 and be passed through a heat exchanger 208 where process fluid 209, such as water or pyrolysis fuel oil, cools the steam-cracked effluent stream 207 to form the cooled steam-cracked effluent stream 210. The steam-cracked effluent stream 207 and cooled steam-cracked effluent stream 210 may include a mixture of cracked hydrocarbon-based materials which may be separated into one or more petrochemical products included in one or more system product streams. For example, the steam-cracked effluent stream 207 and the cooled steam-cracked effluent stream 210 may include one or more of fuel oil, gasoline, mixed butenes, butadiene, propene, ethylene, methane, and hydrogen, which may further be mixed with water from the stream cracking.

According to one or more embodiments, the pyrolysis zone 251 may operate at a temperature of from 700° C. to 900° C. The pyrolysis zone 251 may operate with a residence time of from 0.05 seconds to 2 seconds. The mass ratio of steam 205 to upgraded fuel stream 203 may be from 0.3:1 to 2:1.

The cooled steam-cracked effluent stream 210 may be separated by separation unit 211 into system product streams. For example, the separation unit 211 may be a distillation column which separates the contents of the cooled steam-cracked effluent stream 210 into one or more of a fuel oil stream 212, a gasoline stream 213, a mixed butenes stream 214, a butadiene stream 215, a propene stream 216, an ethylene stream 217, a methane stream 218, and a hydrogen stream 219. As used in this disclosure, the system product streams (such as the fuel oil stream 212, the gasoline stream 213, the mixed butenes stream 214, the butadiene stream 215, the propene stream 216, the ethylene stream 217, and the methane stream 218) may be referred to as system products, sometimes used as feeds in downstream chemical processing.

According to one or more embodiments, at least 5 wt. %, 10 wt. %, or even 15 wt. % of the upgraded fuel stream 203 may have a boiling point of 540° C. or greater. In conventional systems, such as those not comprising the hydrocracking catalyst comprising the nano-sized, mesoporous zeolite Beta presently described, this 540° C.+ fraction may need to be rejected from the steam cracking process depicted in FIG. 2 because of excessive coke formation and non-smooth operation of the steam cracking. However, with the use of the presently described hydrocracking catalyst comprising the nano-sized, mesoporous zeolite Beta presently described, this 540° C.+ fraction may be reduced in wt. % in the upgraded fuel stream 203. Since the 540° C.+ fraction is reduced, steam cracking is more efficient. Without being bound by theory, it is believed that the relatively small particle size and existence of mesopores in the zeolite Beta presently described and included in the hydrocracking catalyst may contribute to the better conversion (for example, aromatic reduction) of the 540° C.+ fraction in the heavy oil feed stream 101 because these relatively large molecules (for example, the 540° C.+ residues) can access active sites, and thus be converted to light fractions, which are more easily converted by steam cracking, thus producing more light olefins.

EXAMPLES

Various embodiments of methods for producing nano-sized, mesoporous zeolite Beta will be further clarified by the following examples. The examples are illustrative in nature, and should not be understood to limit the subject matter of the present disclosure.

Example 1—Synthesis of Presently Disclosed Nano-Size, Mesoporous Zeolite Beta

To form nano-sized zeolite Beta, a fumed silica (AEROSIL® 200, available from Evonic Industries), aluminum powder, and tetraethylammonium hydroxide (TEAOH) (35 wt. % aqueous solution, available from Aldrich) were used as silica source, aluminum source, and template agent, respectively. The precursor gels had the oxide molar compositional ratio of 15-40TEAOH:20-500$SiO_2$:$Al_2O_3$:500-1000$H_2O$. The metal aluminum was dissolved in the part of TEAOH-containing aqueous solution to form a clear solution, and then added to the slurry made by fumed silica and the other part of the TEAOH-containing aqueous solution. The formed aluminosilicate fluid gel was stirred in a beaker at ambient temperature for 4 hours, and then transferred into a polytetrafluoro ethylene (PTFE) lined stainless steel autoclave. The crystallization was carried out at 100° C. to 150° C. for 1-7 hours, either under the static state in an oven or under the rotational state at 60 rpm in a rotated oven.

The produced nano-sized zeolite Beta was then treated with a base aqueous solution (NaOH or ammonia) by combining the nano-sized zeolite Beta with 0.05-2M NaOH or ammonia aqueous solution under stirring at room temperature for 4 to 24 hours. Then, cetrimonium bromide was added to the mixture, where the weight ratio of Cetrimonium bromide to zeolite was from 0.1 to 1.5, and the mixture was stirred at room temperature for 4 to 24 hours. This mixture was then autoclaved at 100° C. to 150° C. for 1 to 5 days, forming mesopores in the nano-sized zeolite Beta. Then, the mixture was separated and washed with purified water three times, and then dried at 100° C. overnight, followed by calcining at 500° C. to 600° C. for 3-6 hours.

Example 2—Characterization of the Presently Disclosed Nano-Size, Mesoporous Zeolite Beta The effect of synthesis conditions on the main properties of the nano-sized zeolite beta and nano-sized mesoporous zeolite beta was synthesized as described in Example 1, and studied in lab. The main properties of the nano-sized zeolites and nano-sized mesoporous zeolite beta were characterized by BET, XRD, TEM, NMR etc, and the results are summarized in Tables 2A, 2B, and 3, respectively.

TABLE 2A

| | Sample # | | | |
|---|---|---|---|---|
| | 1 | 2 | 3 | 4 |
| Synthesis condition | Static | Rotation at 60 rpm | Static | Rotation at 60 rpm |
| Starting gel composition | | | | |
| SiO$_2$/Al$_2$O$_3$ molar ratio | 41.6 | 50 | 50 | 50 |
| TEAOH/Si molar ratio | 0.2 | 0.6 | 0.2 | 0.4 |
| H$_2$O/Al$_2$O$_3$ molar ratio | 800 | 1000 | 700 | 1000 |
| Synthesis condition | | | | |
| Temperature, ° C. | 140 | 140 | 140 | 140 |
| Time, days | 6 | 6 | 8 | 8 |
| Main properties of products | | | | |
| XRD | Beta | Beta | Beta | Beta |
| Average particle size by TEM, nm | 450 | 35 | 550 | 120 |

TABLE 2B

| | Sample # | | | |
|---|---|---|---|---|
| | 5 | 6 | 7 | 8 |
| Synthesis condition | Rotation at 60 rpm | Rotation at 60 rpm | Rotation at 60 rpm | Rotation at 60 rpm |
| Starting gel composition | | | | |
| SiO2/Al2O3 molar ratio | 41.6 | 50 | 50 | 50 |
| TEAOH/Si molar ratio | 0.4 | 0.6 | 0.6 | 0.6 |
| H2O/Al2O3 molar ratio | 750 | 750 | 500 | 500 |
| Synthesis condition | | | | |
| Temperature, ° C. | 140 | 140 | 140 | 140 |
| Time, days | 5 | 3 | 4 | 3 |
| Main properties of products | | | | |
| XRD | Beta | Beta | Beta | Beta |
| Average particle size by TEM, nm | 45 | 38 | 32 | 40 |

TABLE 3

| | Sample # | | | | |
|---|---|---|---|---|---|
| | 9 | 10 | 11 | 12 | 13 |
| Starting nano zeolite sample# | 1 | 5 | 2 | 4 | 7 |
| Nano meso zeolite starting gel composition | | | | | |
| SDA/zeolite weight ratio | 1 | 1 | 1 | 1 | 1 |
| H20/zeolite weight ratio | 30 | 30 | 30 | 30 | 30 |
| NaOH/zeolite weight ratio | 0.1 | 0.1 | 0.05 | 0.05 | 0.1 |
| NaOH, concentration (M) | 0.1 | 0.1 | 0.05 | 0.05 | 0.1 |
| Treating condition in autoclave | | | | | |
| Temperature, ° C. | 120 | 120 | 120 | 120 | 120 |
| Time, day | 7 | 7 | 7 | 7 | 7 |
| Main properties of the final product | | | | | |
| Particle sizes by TEM, nm | 470 | 70 | 43 | 100 | 25 |
| XRD | Zeolite | Zeolite | Zeolite | Zeolite | Zeolite |
| Surface area (m2/g) | 430 | 510 | 500 | 580 | 510 |
| Pore volume (ml/g) | 0.4 | 0.92 | 0.53 | 0.9 | 0.95 |
| Pore size (nm) | 3.7 | 7.2 | 4.2 | 6.2 | 7.5 |

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

The invention claimed is:

1. A nano-sized, mesoporous zeolite particle comprising:
   a microporous framework comprising a plurality of micropores having diameters of less than or equal to 2 nm and a BEA framework type; and
   a plurality of mesopores having diameters of greater than 2 nm and less than or equal to 50 nm;
   wherein the nano-sized, mesoporous zeolite particle has a particle size of less than or equal to 100 nm.

2. The nano-sized, mesoporous zeolite particle of claim 1, wherein the nano-sized, mesoporous zeolite particle has a pore volume of from 0.5 to 1.0 mL/g.

3. The nano-sized, mesoporous zeolite particles of claim 1, wherein the nano-sized, mesoporous zeolite particle has a surface area of from 500 m²/g to 700 m²/g.

4. The nano-sized, mesoporous zeolite particles claim 1, wherein the nano-sized, mesoporous zeolite particle has an average pore size of form 5 nm to 15 nm.

5. A catalyst comprising:
one or more nano-sized, mesoporous zeolite particles each comprising:
a microporous framework comprising a plurality of micropores having diameters of less than or equal to 2 nm and a BEA framework type; and
a plurality of mesopores having diameters of greater than 2 nm and less than or equal to 50 nm;
wherein the nano-sized, mesoporous zeolite particles have a particle size of less than or equal to 100 nm;
a metal oxide support material; and
one or more metal catalyst materials.

6. The catalyst of claim 5, wherein the metal oxide support material comprises alumina.

7. The catalyst of claim 5, wherein one or more of the metal catalyst materials comprise an oxide or sulfide of W, Mo, Ni, or Co.

8. The catalyst of claim 5, wherein the catalyst comprises an oxide or sulfide of W and an oxide or sulfide of Ni.

9. The catalyst of claim 5, wherein the catalyst comprises an oxide or sulfide of Mo and an oxide or sulfide of Ni.

10. The catalyst of claim 5, wherein the catalyst comprises:
from 20 wt. % to 26 wt. % of an oxide or sulfide of W;
from 4 wt. % to 6 wt. % of an oxide or sulfide of Ni;
from 10 wt. % to 60 wt. % of the nano-sized, mesoporous zeolite particles; and
from 10 wt. % to 70 wt. % of alumina.

11. The catalyst of claim 5, wherein the catalyst comprises:
from 14 wt. % to 16 wt. % of an oxide or sulfide of Mo;
from 4 wt. % to 6 wt. % of an oxide or sulfide of Ni;
from 10 wt. % to 60 wt. % of the nano-sized, mesoporous zeolite particles; and
from 20 wt. % to 80 wt. % of alumina.

12. A process for upgrading heavy oil, the process comprising:
reducing aromatics content in the heavy oil by contacting the heavy oil with a hydrocracking catalyst comprising one or more nano-sized, mesoporous zeolite particles each comprising:
a microporous framework comprising a plurality of micropores having diameters of less than or equal to 2 nm and a BEA framework type; and
a plurality of mesopores having diameters of greater than 2 nm and less than or equal to 50 nm;
wherein the nano-sized, mesoporous zeolite particles have a particle size of less than or equal to 100 nm.

13. The process of claim 12, further comprising removing at least a portion of one or more of metals, nitrogen, or sulfur from the heavy oil by contacting the heavy oil with one or more additional hydrotreating catalysts.

14. The process of claim 12, wherein the one or more additional hydrotreating catalysts comprise one or more of a hydrodemetalization catalyst comprising molybdenum, a transition catalyst comprising molybdenum and nickel, or a hydrodenitrogenation catalyst comprising molybdenum and nickel.

15. The process of claim 12, wherein the heavy oil comprises crude oil.

16. The process of claim 12, wherein the heavy oil has an American Petroleum Institute (API) gravity of at least 25 degrees.

17. A hydroprocessing system comprising:
one or more of a hydrodemetalization catalyst, a transition catalyst, or a hydrodenitrogenation catalyst; and
a hydrocracking catalyst positioned downstream of the one or more of the hydrodemetalization catalyst, the transition catalyst, or the hydrodenitrogenation catalyst, the hydrocracking catalyst comprising nano-sized, mesoporous zeolite particles, wherein each nano-sized, mesoporous zeolite particle comprises:
a microporous framework comprising a plurality of micropores having diameters of less than or equal to 2 nm and a BEA framework type; and
a plurality of mesopores having diameters of greater than 2 nm and less than or equal to 50 nm;
wherein the nano-sized, mesoporous zeolite particles have a particle size of less than or equal to 100 nm.

18. The hydroprocessing system of claim 17, wherein the hydroprocessing system comprises the hydrodemetalization catalyst, the transition catalyst, and the hydrodenitrogenation catalyst.

19. The hydroprocessing system of claim 18, wherein the hydrodemetalization catalyst, the transition catalyst, the hydrodenitrogenation catalyst, are in a packed bed reactor.

20. The hydroprocessing system of claim 18, wherein the hydrocracking catalyst is in the packed bed reactor.

21. The hydroprocessing system of claim 17, wherein the hydrocracking catalyst further comprises a metal oxide support material and one or more metal catalyst materials.

* * * * *

UNITED STATES PATENT AND TRADEMARK OFFICE
CERTIFICATE OF CORRECTION

PATENT NO. : 10,773,248 B2  
APPLICATION NO. : 15/790361  
DATED : September 15, 2020  
INVENTOR(S) : Lianhui Ding et al.

Page 1 of 1

It is certified that error appears in the above-identified patent and that said Letters Patent is hereby corrected as shown below:

On the Title Page

Column 2, item (56), other publications, cite no. 5, delete "PCT/US2013/030430" and insert --PCT/US2018/030430--, therefor.

Signed and Sealed this  
Twenty-ninth Day of December, 2020

Andrei Iancu  
*Director of the United States Patent and Trademark Office*